(12) United States Patent
Humphrey et al.

(10) Patent No.: US 9,998,239 B2
(45) Date of Patent: Jun. 12, 2018

(54) AUTOMATED RADIO FREQUENCY TESTING MANAGEMENT SYSTEM

(71) Applicant: FedEx Supply Chain Logistics & Electronics, Inc., Fort Worth, TX (US)

(72) Inventors: Clark Humphrey, Fort Worth, TX (US); Gregory Frenzel, Fort Worth, TX (US); Carlos Jimenez, Keller, TX (US); Scott Wittrock, Flower Mound, TX (US); Robert Ripperden, Fort Worth, TX (US); Ken Nguyen, Fort Worth, TX (US)

(73) Assignee: FedEx Supply Chain Logistics & Electronics, Inc., Fort Worth, TX (US)

( * ) Notice: Subject to any disclaimer, the term of this patent is extended or adjusted under 35 U.S.C. 154(b) by 0 days. days.

(21) Appl. No.: 15/654,466

(22) Filed: Jul. 19, 2017

(65) Prior Publication Data

US 2017/0317767 A1    Nov. 2, 2017

Related U.S. Application Data

(63) Continuation of application No. 14/838,470, filed on Aug. 28, 2015, now Pat. No. 9,749,064.

(51) Int. Cl.
*H04B 17/00* (2015.01)
*G06F 17/30* (2006.01)

(52) U.S. Cl.
CPC ... *H04B 17/0087* (2013.01); *G06F 17/30312* (2013.01); *H04B 17/0085* (2013.01)

(58) Field of Classification Search
CPC ..... H04W 24/06; H04W 24/00; H04W 24/02; H04W 24/08; G01R 29/0821; G01R 29/105; G01R 31/001; G01R 29/0814; H04B 17/0085; H04B 17/15; H04B 17/16; H04B 17/309; H04B 17/3912; H04B 7/0802; H04B 7/10; H04B 17/0087; H04L 41/145; H04L 43/50; H04M 1/24

See application file for complete search history.

(56) References Cited

U.S. PATENT DOCUMENTS

| | | |
|---|---|---|
| 5,625,621 A | 4/1997 | Christensen et al. |
| 5,680,397 A | 10/1997 | Christensen et al. |
| 5,805,667 A | 9/1998 | Alvarez et al. |
| 8,145,966 B2 | 3/2012 | Roblett et al. |
| 2003/0019747 A1 | 1/2003 | Saffell et al. |
| 2005/0053008 A1 | 3/2005 | Griesing et al. |
| 2005/0081023 A1* | 4/2005 | Bullis ................. H04L 41/0803 713/1 |
| 2006/0239198 A1 | 10/2006 | Mlinarsky et al. |
| 2007/0140688 A1 | 6/2007 | Patel et al. |
| 2007/0157714 A1* | 7/2007 | Rankin ................. G01M 3/025 73/114.56 |
| 2007/0223517 A1 | 9/2007 | Warren et al. |
| 2007/0237141 A1* | 10/2007 | Marchese ............... H04L 41/12 370/389 |

(Continued)

*Primary Examiner* — Devan Sandiford
(74) *Attorney, Agent, or Firm* — McGuireWoods LLP

(57) ABSTRACT

The disclosed embodiments include an automated RF testing management system that is configured to control a plurality of RF testing units, each having multiple test ports for performing RF testing of various electronic devices. Advantages of the disclosed embodiments include cost savings, increase productivity, and ease of configuration and maintenance.

19 Claims, 9 Drawing Sheets

(56) References Cited

U.S. PATENT DOCUMENTS

| | | |
|---|---|---|
| 2008/0020746 A1 | 1/2008 | Alexander et al. |
| 2009/0006024 A1 | 1/2009 | Seguin et al. |
| 2010/0057395 A1 | 3/2010 | Ding et al. |
| 2010/0125438 A1 | 5/2010 | Audet |
| 2010/0191143 A1 | 7/2010 | Ganter et al. |
| 2010/0218044 A1 | 8/2010 | Roblett et al. |
| 2010/0227607 A1 | 9/2010 | Lorion et al. |
| 2012/0306580 A1 | 12/2012 | Elli |
| 2013/0188504 A1* | 7/2013 | Partee .................. H04H 60/32 370/252 |
| 2014/0006862 A1 | 1/2014 | Jain et al. |
| 2014/0160961 A1 | 6/2014 | Dragulescu et al. |
| 2014/0250328 A1 | 9/2014 | Schnizler et al. |
| 2014/0269386 A1 | 9/2014 | Chu et al. |
| 2014/0272500 A1 | 9/2014 | Roumi et al. |
| 2014/0307701 A1 | 10/2014 | Markwart et al. |
| 2015/0109941 A1 | 4/2015 | Zhang et al. |
| 2015/0253357 A1 | 9/2015 | Olgaard |
| 2016/0314056 A1 | 10/2016 | Greene et al. |
| 2017/0090447 A1 | 3/2017 | Skocypec et al. |

\* cited by examiner

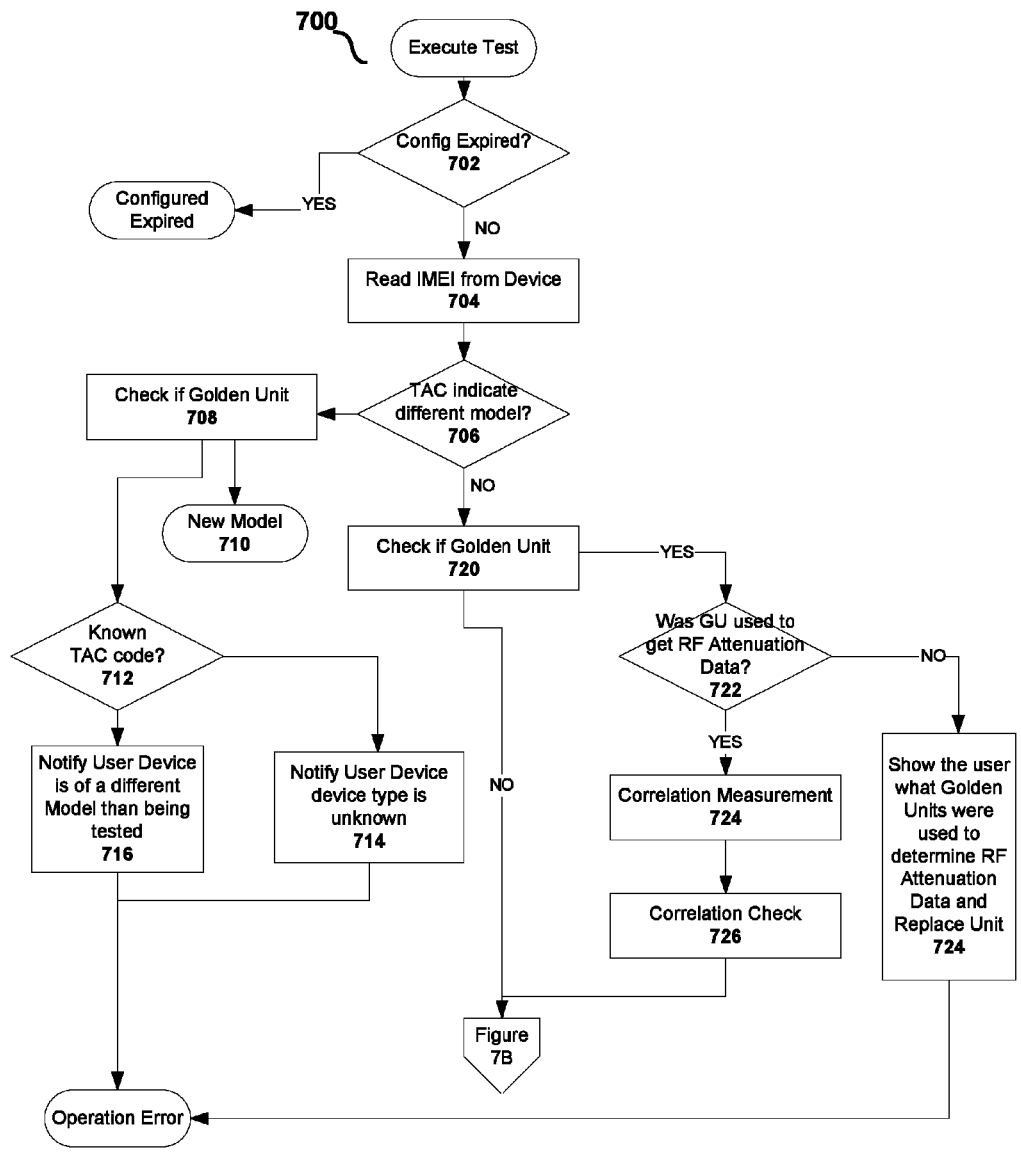

AUTOMATED RADIO FREQUENCY TESTING MANAGEMENT SYSTEM

CROSS-REFERENCE TO RELATED APPLICATIONS

This application is a Continuation Application which claims priority and benefit of U.S. Non-Provisional Application Ser. No. 14/838,470, filed Aug. 28, 2015, entitled AUTOMATED RADIO FREQUENCY TESTING MANAGEMENT SYSTEM, the disclosures of which are incorporated herein in their entirety for all purposes.

BACKGROUND

The present disclosure relates generally to systems and methods that are configured to automate and improve the radio frequency (RF) testing process of electronic devices.

RF is any frequency within the electromagnetic spectrum associated with radio wave propagation. When an RF current is supplied to an antenna, an electromagnetic field is created that then is able to propagate through space. Many wireless technologies are based on RF field propagation. These frequencies make up part of the electromagnetic radiation spectrum.

RF waves can be characterized by a wavelength and a frequency. The wavelength is the distance covered by one complete cycle of the electromagnetic wave, while the frequency is the number of electromagnetic waves passing a given point per unit of time. The frequency of an RF signal is usually expressed in terms of a unit called the hertz (Hz). One Hz equals one cycle per second. One megahertz (MHz) equals one million cycles per second. Different forms of electromagnetic energy are categorized by their wavelengths and frequencies. The RF part of the electromagnetic spectrum is generally defined as that part of the spectrum where electromagnetic waves have frequencies in the range of about 3 kilohertz (3 kHz) to 300 gigahertz (300 GHz).

Probably the most important use for RF energy is in providing telecommunications services. Radio and television broadcasting, cellular telephones, radio communications for police and fire departments, amateur radio, microwave point-to-point links, and satellite communications are just a few of the many telecommunications applications. There are also many non-communication applications that use RF energy. For example, RF energy is also used in medical applications such as cosmetic treatments, magnetic resonance imaging (MRI), and used to destroy cancer cells.

Because of the multitude of RF applications in the world, it is imperative that products and systems be electromagnetic compatible (EMC). In other words, the products and systems must be able to operate in their electromagnetic environment without introducing intolerable electromagnetic disturbances back into the environment. Therefore, before a product or system hits the marketplace, it must be tested for RF immunity and emissions. For RF immunity testing, the equipment is exposed to RF disturbances and fields with field strengths and frequency ranges representative of their in-operation environment. On the other hand, when a piece of equipment is tested for RF emissions, the equipment, under normal operation, is monitored for RF disturbances and fields.

SUMMARY OF THE DISCLOSED EMBODIMENTS

The disclosed embodiments include an automated radio frequency (RF) testing management system (ARMS). In one embodiment, the ARMS includes a database configured to store data for performing automated radio frequency testing on a plurality of electronic devices and store their test result data; a web server configured to provide a web interface to the automated radio frequency testing management system; and at least one test station comprising a test station controller in communication with at least one test set. Each test set may be configured with multiple test ports, each connected to an RF shield box for performing the RF testing on the plurality of electronic devices. In one embodiment, the test station controller is configured to receive data from the database for performing the automated radio frequency testing on the plurality of electronic devices.

As will be further described, the disclosed embodiments support test sets having multiple test ports. Each of the test ports may be connected to an RF shield box via a wired cable. Embodiments include an automated RF testing management system that is configured to automatically identify the model of an electronic device based on its International Mobile Equipment Identity (IMEI) or Mobile Equipment Identifier (MEID). Additionally, embodiments of the disclosed ARMS are configured to perform port configuration when needed such as, but not limited to, when a new model is being tested or after a predetermined time period since the last port configuration. Embodiments of the disclosed ARMS also support simultaneous testing of different models on each of the ports.

In certain embodiments, testing, configuration, and results data are also stored in a central location. For example, embodiments of the disclosed ARMS may include a single master script that controls the testing of all models of electronic device, and based on identifying the model of the device under test (DUT), the ARMS loads and runs the appropriate test scripts and compares the results to the appropriate tolerance data.

Additional details of the disclosed embodiments are provided below in the detailed description and corresponding drawings.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

FIGS. 7A and 7B is a flowchart depicting a process for executing a radio frequency test in accordance with a disclosed embodiment.

Figure 1:
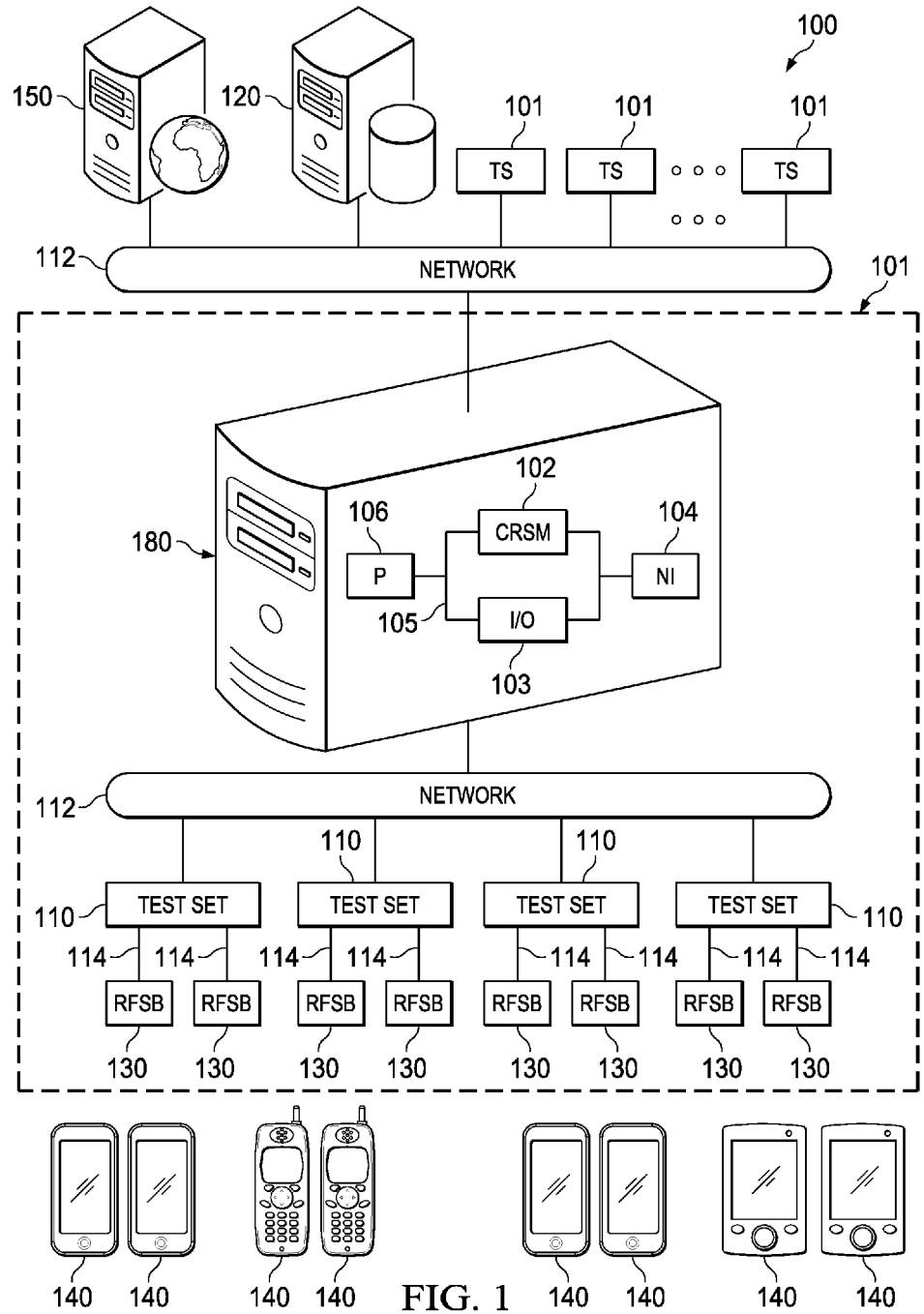
FIG. 1 is a network diagram and system diagram of an automated radio frequency testing management system in accordance with a disclosed embodiment.

The illustrated figures are only exemplary and are not intended to assert or imply any limitation with regard to the environment, architecture, design, or process in which different embodiments may be implemented.

DETAILED DESCRIPTION

In the description which follows the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may be embodied in a wide variety of contexts. Embodiments discussed herein are merely representative and do not limit the scope of the invention.

Embodiments of an automated radio frequency (RF) testing management system are disclosed herein that automates the RF testing process of electronic devices. In one embodiment, the ARMS stores all test results and test configurations in a central database. In addition, in certain embodiments, the ARMS may be configured to provide an automated system for performing re-configuration and re-correlation of one or more RF test sets, thus allowing the operator to perform changeovers to a new model. Each ARMS test station will support multiple RF test sets. The robustness of this system will allow for a range of statistical checks to maintain strict quality control over the test environment.

Referring now to the drawings, FIG. 1 is a network diagram of an automated radio frequency testing management system (ARMS) 100 in accordance with a disclosed embodiment. In one embodiment, the ARMS 100 comprises a database 120, a web server 150, and one or more test stations 101. Each test station 101 includes a test station controller 180 that is in communication with a plurality of radio frequency test sets 110. The test station 101 is also in communication with a central database such as database 120. This configuration enables a single database to provide instructions and data to a plurality of test stations 101. As will be further discussed, one advantage of this configuration is that updates and instructions need only be loaded into a single location at database 120, which can then be queried by each of the test stations 101 for performing RF testing.

Communication between the various devices may be direct or over a communication network such as network 112. Network 112 may be any type of wired or wireless connection, which may include one or more public or private networks or some combination thereof, such as the Internet, an intranet, a mobile cellular or data network, or any other network operable to transmit data between the various devices. For example, in one embodiment, the test station controller 180 may be connected to the test sets 110 via Ethernet on a separate or local network isolated to only that particular test station controller 180. Each RF test set 110 may be assigned a specific IP address defined by it physical location at the station. In alternative embodiments, communication between the test station controller 180 and the test sets 110 may be through any type of network including one or more private and/or public networks such as, but not limited to, a local or wide area network and the Internet.

In the depicted embodiment, the test station controller 180 comprises a plurality of components including one or more processors 106, a computer-readable storage media 102, an input/output interface 103, and a network interface 104. Each of the components of the test station controller 180 communicates via a systems bus 105 that transfers data between the components. The processors 106 are configured to process data and execute computer-executable instructions. These instructions may include, but are not limited to, machine code instructions, bytecode for a software interpreter, object code, and source code in a high-level programming language.

Data and computer-executable instructions are stored in the computer-readable storage media 102. The computer-readable storage media 102 may be any appropriate memory device or computer storage media, such as, but not limited to, a hard disk drive, random access memory, read only memory, electrically erasable programmable read-only memory, flash memory or other memory technology, compact disc—read only memory, digital versatile disks or other optical disk storage, magnetic cassettes, magnetic tape, magnetic disk storage or other magnetic storage devices. In some embodiments, the data and executable instructions may be stored on a component or device that is external to the test station controller 180 (e.g., on the cloud, an external memory drive, or an external database).

The input/output (I/O) interface 103 comprises an input interface for receiving user input or data from one or more peripheral devices. For example, the I/O interface 103 may receive user input or data from one or more input devices such as, but not limited to, a keyboard, mouse, touch screen, microphone, scanner, and/or a camera. The I/O interface 103 also comprises an output interface for outputting information to one or more device or component associated with the test station controller 180. For example, the I/O interface 103 may output data or other information to a display device for displaying information to a user, another system, and/or to a printer.

The network interface 104 may include one or more wired or wireless interfaces such as, for example, an Ethernet port or a wireless transceiver for enabling the test station controller 180 to send and receive data over one or more networks, such as, but not limited to, network 112. The network interface 104 is not limited to any particular communication protocol or hardware interface.

Although not depicted in detail in FIG. 1, one of ordinary skill in the art understands that each of the various devices in the ARMS 100, including, but not limited to the database 120 and the web server 150, includes the basic components as described above with the respect to the test station controller 180, such as, but not limited to, a processor and memory for storing and executing instructions, and a network interface for communicating with other devices/systems over a network.

In one embodiment, the test station controller 180 may be configured to support up to four RF test sets 110, with each RF test set 110 configured to support two RF shield boxes 130, each RF shield box 130 connected to one of its two ports. As used herein out, each RF shield box 130 connected to a port of a RF test set 110, via a RF cable 114, will be generally referred to as a test port. In one embodiment, each RF cable 114 and RF shield box 130 may be labeled with a unique alphanumeric identifier that can be scanned into the PC using an attached scan gun. Because each test port is uniquely identifiable, the RF test set 110 may be configured to test two devices concurrently using the two RF shield boxes 130.

Alternatively, in some embodiments, the test station controller 180 may be configured to alternate the testing of electronic devices between each pair of RF shield boxes 130. For example, in one embodiment, having the pair of RF shield boxes 130 allows an operator to run a device under test (DUT) in one RF shield box 130, while swapping out units in the other RF shield box 130. Under this configuration, the test station controller 180 supports the testing of at least 4 DUTs concurrently; assuming 1 DUT per RF test set 110. In certain embodiments, the test station controller 180 may be configured to prohibit simultaneous testing of two devices attached to the same RF test set 110.

It should be understood that the disclosed embodiments are not limited to supporting exactly four RF test sets 110 or that the number of RF shield boxes 130 coupled to a RF test set 110 is limited to two. Embodiments of the disclosed test stations 101 may be configured to support any number of RF test sets 110 having any number of test ports.

In addition, in one embodiment, the system may be capable of simultaneously supporting numerous versions and models of RF test set 110 and RF shield boxes 130 on a single test station controller 180. In one embodiment, each test port is configured independently from the other ports. Thus, the test station controller 180 may be configured to support the simultaneous testing of different models on each test port.

In one embodiment, certain users may be allowed to perform the test port configuration process for reconfiguring a test port on a RF test set 110 to a new model of an electronic device. If allowed, in one embodiment, the user may initiate the port configuration process by placing a golden unit in the RF shield box 130 that is connected to an un-configured test port. A golden unit is an electronic device that is used as a calibration standard for configuring a test port. For instance, each golden unit is associated with a particular service provider/carrier, manufacturer, and model of an electronic device.

In accordance with the disclosed embodiments, the test station controller 180 may also be in communication with the web server 150 for providing an ARMS web-based dashboard. In one embodiment, the ARMS web-based dashboard provides a web interface or web-based application to the ARMS 100 for enabling local or remote users to log into the ARMS 100 to enable, among other things, controlling operations, monitoring testing, performing diagnostics, and retrieving testing data. In one embodiment, available operations for a user may be enabled based on the capabilities assigned to the user or the user's assigned user type. In addition, the assigned user type may specify or limit the RF test set 110 available to a user. For example, in one embodiment, user types include operator, supervisor, engineer and technician. In one embodiment, the operations assigned to each role may be defined in the database 120, thus allow tailoring to specific needs. For example, table 1 below illustrates an example of capabilities assigned to user roles in accordance with an embodiment.

TABLE 1

| Component | Operation | Operator | Supervisor | Engineer | Technician |
|---|---|---|---|---|---|
| Automated RF Test Station | DUT RF Test | ✓ | | ✓ | ✓ |
| | Diagnostics Mode | | | ✓ | ✓ |
| | Force Re-Correlation | | | ✓ | ✓ |
| | Change Own Password | ✓ | | ✓ | ✓ |
| | Select User Type | | | ✓ | ✓ |
| ARMS Dashboard | Manage Users | | ✓ | ✓ | |
| | View Test Results | | ✓ | ✓ | ✓ |
| | RQIL Report | | ✓ | ✓ | ✓ |

TABLE 1-continued

| Component | Operation | Operator | Supervisor | Engineer | Technician |
|---|---|---|---|---|---|
| | Run Statistical Reports | | ✓ | ✓ | |
| | Register New golden unit | | | ✓ | |
| | Deactivate/ Reactivate golden unit | | | ✓ | |
| | Edit TAC Code List for Model | | | ✓ | ✓ |
| | Edit Test Sequence or Test Criteria | | | ✓ | |
| | Configure Station | | ✓ | ✓ | ✓ |
| | Statistical Diagnostics | | | ✓ | |
| | Edit Correlation Check Tolerances | | | ✓ | |
| | Change Own Password | ✓ | | ✓ | ✓ |
| Database SQL | Add New Group or Carrier | | | ✓ | |
| | Add New Role | | | ✓ | |

In certain embodiments, the ARMS 100 is configured to support the defining of additional roles with their own unique set of available operations. In addition, in certain embodiments, a user may be assigned to more than one user type, in which case the ARMS 100 will be configured to enable the user to switch between their assigned user types.

In one embodiment, during initialization or startup of the ARMS 100, the system is configured to read the station configuration data from the database 120. The system then scans for active RF test sets 110 defined by the station configuration record. If any of the RF test sets 110 is not active, the application notifies the user. If all RF test set 110 are active, each RF test set 110 is cleared and set to a known state. For instance, in certain embodiments, if a user successfully logs in to the ARMS 100, all configured RF test sets 110 are cleared and the ARMS 100 is configured to restore configuration of the test ports to a state that they were in when the last user logged out.

In one embodiment, restoring configuration of the test ports includes restoring persistence data such as, but not limited to, RF attenuation records, test criteria, test sequence ID, last configuration time, and station fault detection data. In certain embodiments, the ARMS 100 may be configured not to restore the configuration of the test ports to a state that they were in when the last user logged out if 1) the last user was not logged out successfully such as improperly closing the application before logging out, the system or application crashed, or there was a power failure, 2) a RF test set 110 has been re-allocated to a different group of users or to the testing of a different make or model of an electronic device since the last user logged out, 3) the previous user does not have save persistence data capability assigned to their user type, 4) the previous user chose to logout without saving current port configuration, or 5) the port configuration has expired. For example, as will be further described, in one embodiment, the port configuration expires after 24 hours.

In one embodiment, when a user logs out of the system, the system does not terminate but instead returns to a sign in screen. In some embodiments, a user may only be able to log out when testing on all test ports has completed or has been aborted. Based on the capabilities assigned to the user type, the user may be able to log out normally or log out without saving current port configuration.

In some embodiments, the application may be configured to provide a single window or user interface to control and monitor all devices in test. For example, the application may be configured to monitor the activity on all test ports. In one embodiment, if all test ports remain idle for more than a specified time, the user may be prompted an automated logout warning. If the user does not respond to the prompt within a defined time, the application is configured to log the user out. In addition, in certain embodiments, the user interface may support independent controls for starting and aborting the test of each DUT except for the case of sharing ports on the same RF test set 110. In some embodiments, the user interface may be dynamic and automatically optimize available window or viewing real estate by adapting to the number of active RF test sets 110. For example, in one embodiment, the user interface expands the size allocated to each test port when fewer RF test sets 110 are online or when only one test port is configured to a RF test set 110.

As stated above, as part of the process of automating and simplifying RF testing of electronic devices, each of the test station controllers 180 communicate with the database server 120. The database 120 provides the advantage of enabling the ARMS 100 to be configured easily. For instance, by storing all the instructions and data in a central database, the ARMS 100 can be easily expanded, updated, and centrally controlled, which enables testing consistency among the test stations 101 and RF test sets 110. In addition, in certain embodiments, the ARMS 100 may be configured to simultaneously support various configurations of the test stations 101 with the use of a single database. For example, one test station 101 may be employed for the testing of a first type of electronic device or model 140 using two RF test sets 110, while another test station 101 may be used for the testing of a second type of electronic device or model 140 using four RF test sets 110.

Figure 2:
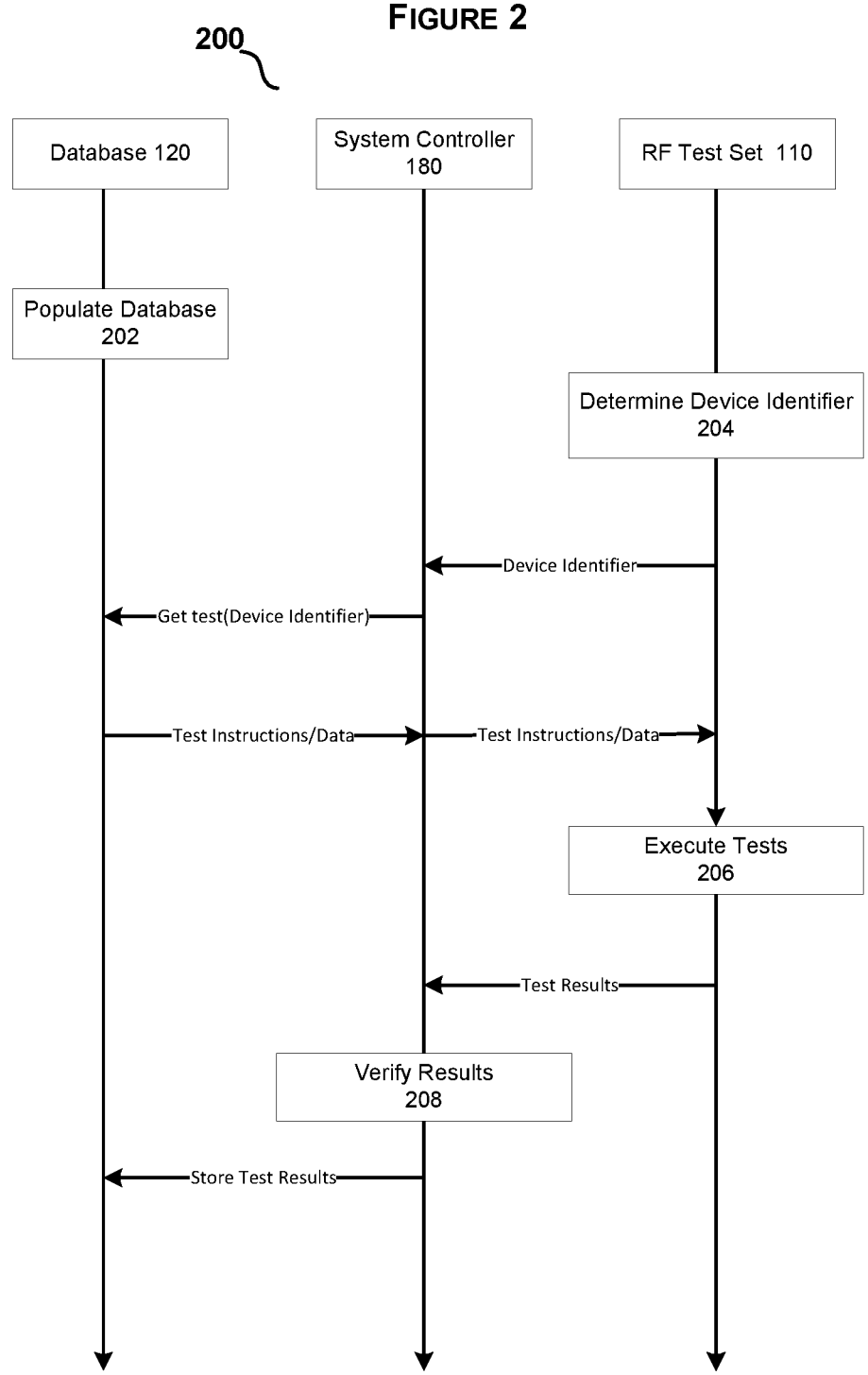
FIG. 2 is a sequence diagram depicting an overview of an automated RF testing process in accordance with a disclosed embodiment.

FIG. 2 is a sequence diagram depicting an overview of an automated RF testing process in accordance with a disclosed embodiment. In one embodiment, the database 120 is populated at step 202 to contain all the test configuration data for various makes and models of electronic devices tested by each of the test stations 101. For example, in one embodiment, the database 120 may include a plurality of scripts for testing all models of electronic devices. Alternatively, the database 120 may include a single master script for testing all models. In one embodiment, the database 120 also includes all the testing data including calibration data, test results, and expected value ranges.

As will be further described, each of the RF test sets 110 are configured at step 204 to be able to determine a device identifier such as, but not limited to, an International Mobile Equipment Identity (IMEI) associated with the electronic device under test. The device identifier is then passed to the test station controller 180, which then queries the database 120 to retrieve the test instructions from the database 120.

The test station controller 180 uses the retrieved test instructions to execute the appropriate tests on the RF test set 110 at step 206. The test results are then passed from the RF test set 110 to the test station controller 180, where the results of the tests are verified at step 208 to determine whether the device is functioning properly.

The results of the tests are then stored in the database 120. By storing the results in a central location, the disclosed system enables quick data search retrieval and statistical analysis to be performed on the gathered data. For example, using the collective data from all the test stations 101, the ARMS 100 may be configured to predict attenuation values for a RF test set 110, modify calibration data, and determine trends in data to identify when a RF test set 110 is out of calibration or when a particular model of an electronic device has a defect. For instance, in one embodiment, the collective data may be used to determine if there is an issue with the transceiver of a particular model of an electronic device and if so, a notification may be sent to the manufacturer or service provider of the electronic device. For example, if the collective data indicates a problem with a particular model across all test stations 101, then a determination is made that there is a problem with the particular model, whereas if the collective data indicates that a problem with a particular model or electronic device occurs only at a particular RF test set 110, then a determination is made that there is a problem with the RF test set 110. For example, the RF test set 110 may require recalibration, readjustment, or part needs to be replaced.

In addition, another advantage of the disclosed embodiments is that any modification to a test for a current or new device such as, but not limited to, test scripts or test data, needs only be loaded into a single location in the database 120 as opposed to having to update or configured each RF test set 110, test station controller 180, or each test stations 101 separately. Further, in some embodiments, functional groups may be created and stored in the database 120, which enables various devices or tests to be assigned to a particular group. For example, in one embodiment, a functional group may be assigned to new devices that performs a particular set of tests, while a second functional group may be assigned for refurbished devices that performs a second set of tests and may also have a different set of acceptable result ranges that are different from that in the new devices functional group. As an example, RF testing for bit error rate (BER) on new devices may require that testing be performed at multiple power levels to determine that the new device passes the BER threshold at each power level, whereas BER testing on refurbished devices may only require that testing be performed at a particular power level and that the refurbished device passes the BER threshold at this one level.

Functional groups may also be assigned to a particular manufacturer or service provider of an electronic device or a component of the electronic device, such as, but not limited to, the transceiver of the electronic device. For example, depending on the manufacturer or service provider of an electronic device or a component of the electronic device, functional groups may be assigned to perform RF testing using different communication protocols, such as CMDA and GSM, and/or using different channels or frequencies assigned to the service provider.

Thus, various configurations of tests may be performed by simply updating the data in the database 120. In certain embodiments, by storing the data and test scripts in a central database, maintenance may be performed on a RF test set 110, without interrupting the functionality of the other RF test sets 110.

Figure 3:
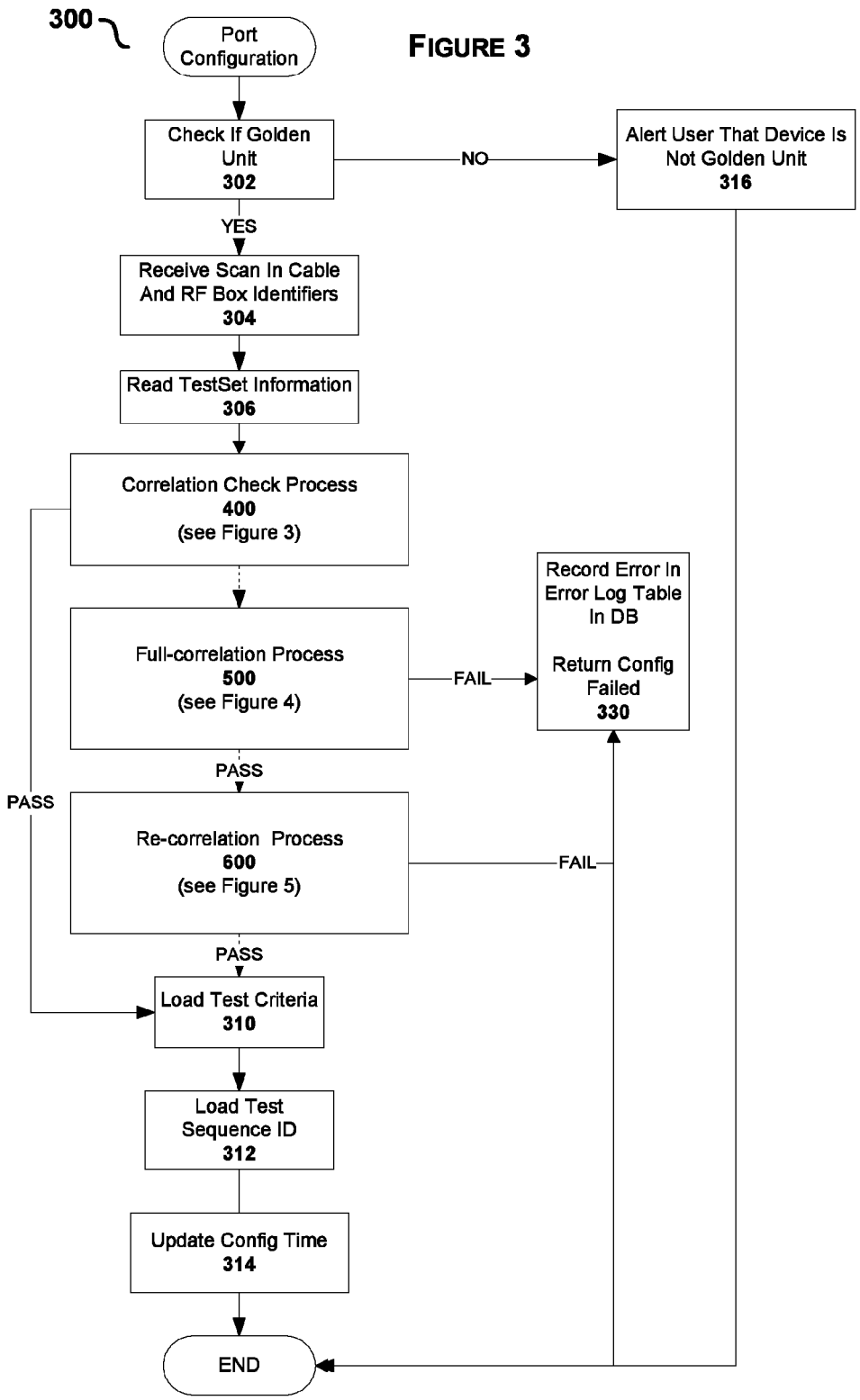
FIG. 3 is a flowchart depicting a process for performing port configuration of a radio frequency testing unit in accordance with a disclosed embodiment.

In addition, using the data and instructions stored in the database 120, the disclosed embodiments can be configured to perform automated re-configuration of the test port. For example, FIG. 3 depicts a flowchart of a port configuration process 300 for performing port configuration of a radio frequency testing unit in accordance with a disclosed embodiment. In one embodiment, the port configuration process 300 begins at step 302 by verifying that a device placed in an RF shield box 130 is a golden unit. For example, in one embodiment, the process is configured to read the IMEI of the device and identify the model type of the device by maintaining a set of Type Allocation Codes (TACs)

associated with each model type. For instance, in one embodiment, a list of golden units is maintained in the database 120 and identifies its carrier, OEM, and model. In one embodiment, if the device placed in the RF shield box 130 is not a golden unit, the process provides a notification to the operator at step 316 and the port configuration process terminates.

In one embodiment, if the device is a golden unit, the port configuration process at step 304 is configured to prompt the user to scan in or enter the RF cable ID and RF shield box ID. This step is performed to detect any hardware changes to the test port configuration.

Figure 5:
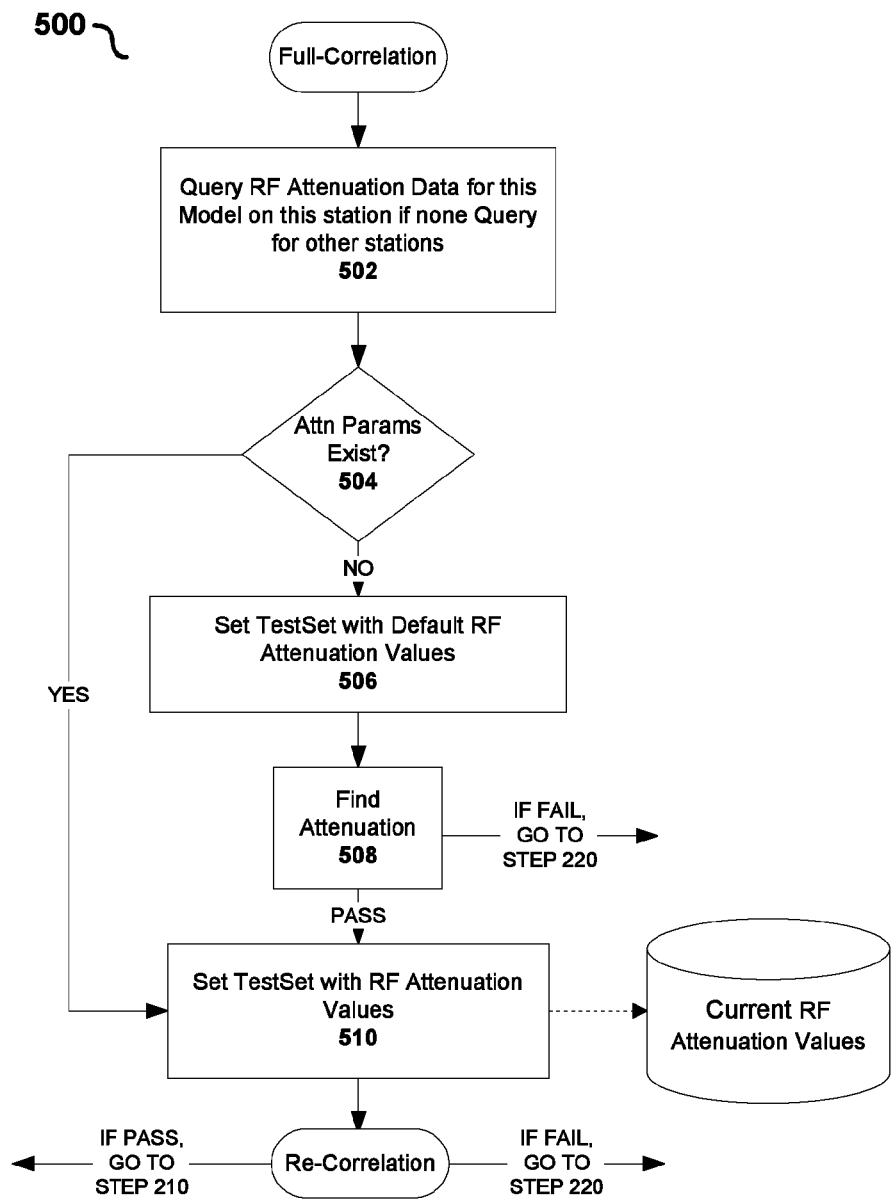
FIG. 5 is a flowchart depicting a process for performing a full correlation in accordance with a disclosed embodiment.
Figure 6A:
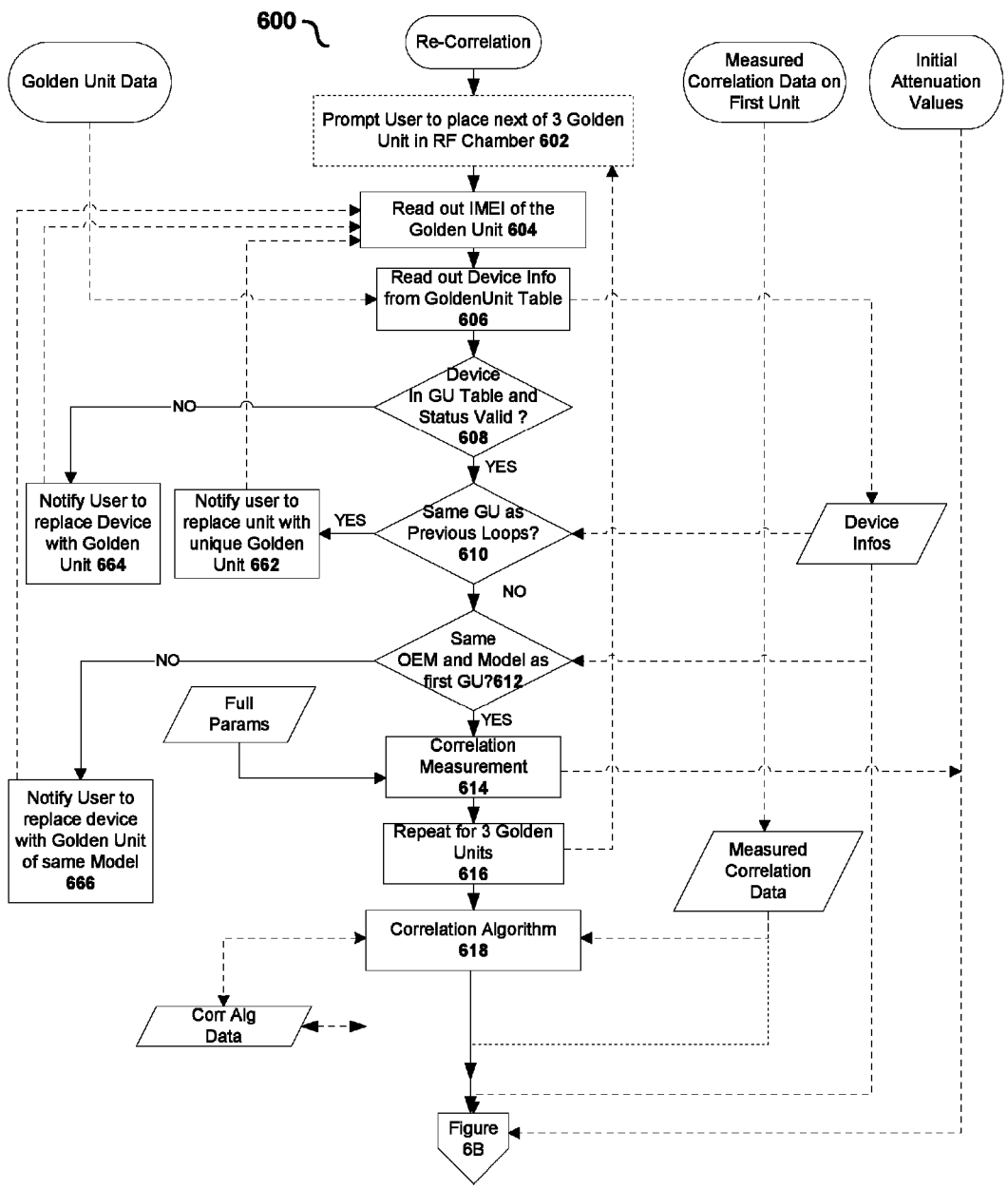
FIGS. 6A and 6B depict a flowchart of a process for performing a re-correlation in accordance with a disclosed embodiment.
Figure 6B:
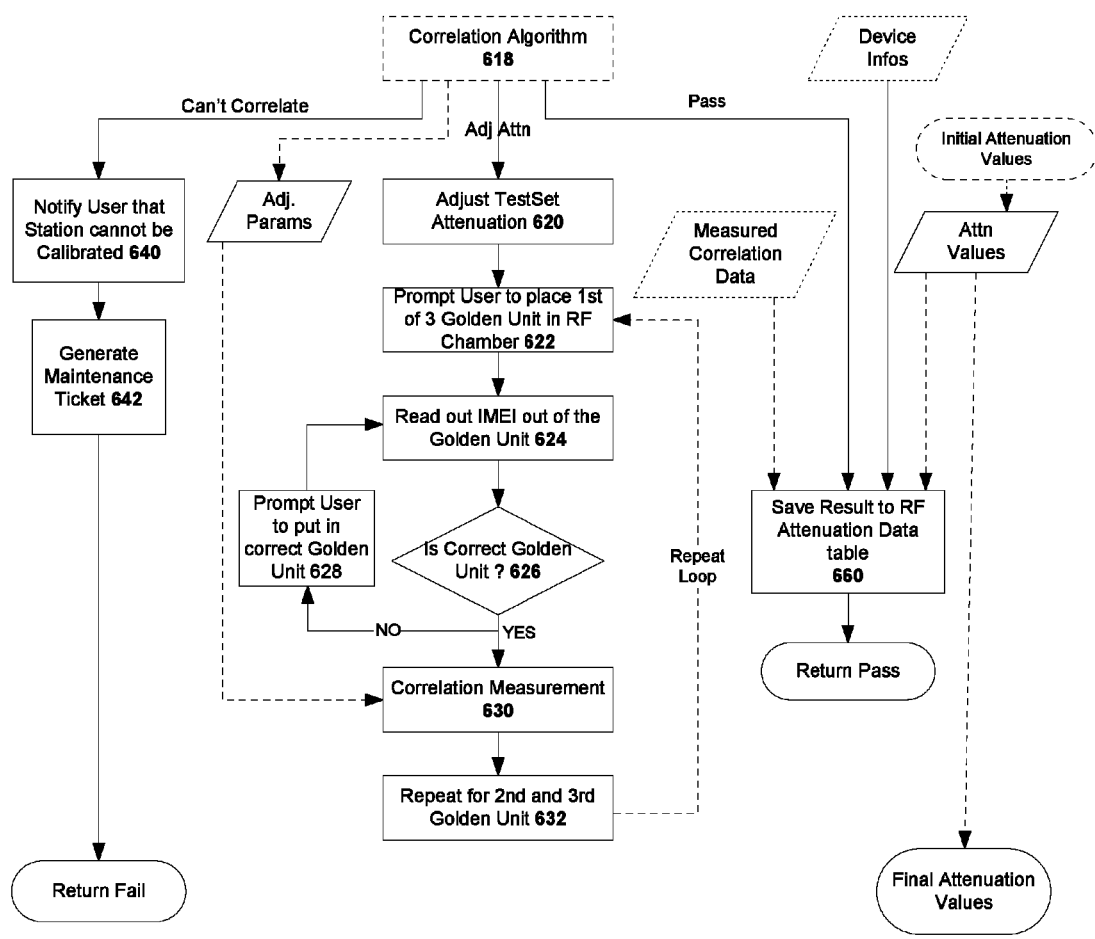

In one embodiment, the test port configuration process may include a correlation check (FIG. 4), full-correlation (FIG. 5), and a re-correlation (FIGS. 6A and 6B). A correlation check performs the process of verifying that a golden unit matches within tolerances to the correlation values previously measured during re-correlation for that exact device on that test port. A full-correlation process attempts to find the correct RF attenuation values by first performing a find correlation function on the RF test set 110 using one golden unit to determine approximate RF attenuation values and then performing a re-correlation to get the exact values. A re-correlation process attempts to find the correct RF attenuation values by repetitively measuring correlation parameters on three golden units. In one embodiment, during each pass the RF attenuation values are tweaked in order to find the ideal RF attenuation values. The RF attenuation values for each test port may be stored in the database 120.

Referring back to FIG. 3, if the correlation check, which may include a full-correlation process and a re-correlation process, is not successful, the process records the error in an error log table. The error log table may be stored in the database 120. In one embodiment, the error log entries contains the following data: time of the failure, station ID, test set serial number or equivalent, RF shield box ID, RF cable ID, test set port number, carrier, OEM, model, user name, error category (i.e. communication timeout, test set error), and any additional error details. The process then returns or provides an indication that the port configuration process has failed and then terminates.

However, if the correlation check is successful, the process is configured to retrieve the test sequence ID and test criteria from the database 120 and load the test criteria at step 310 and the test sequence ID at step 320. The test sequence defines the sequence of test to be executed during an RF test. The test criteria define the test tolerances allowed for all of the measurements taken during a RF test. For example, in one embodiment, each measured parameter may contain the following data: test name, test description measurement parameter, band, channel, lower limit, upper limit, and RF attenuation data. In one embodiment, the test name must match to the test defined in the test sequence. In one embodiment, the test criteria are defined by a carrier specification.

In some embodiments, the RF attenuation data in the database may contain the RF attenuation values, measurement configuration, supported device info, correlation data and record status. The RF attenuation data may contain the following measurement configuration data: station ID, test set serial number or equivalent, RF shield box ID, RF cable ID, test set port number, operator, automated RF tester software version, test set firmware, base, and date and time of the correlation. In addition, in one embodiment, the RF attenuation data contains the correlation data for each of the three golden units used to perform the correlation. For example, in one embodiment, each record may contain the following data for each golden unit: IMEI of the golden unit, and a full set of correlation data taken for the device. In one embodiment, the RF attenuation data contains a status value for the record to indicate if the record is invalid or valid.

In certain embodiments, the database 120 may contain a library of test criteria. The test criteria may maintain a history of all test criteria used in production. Each test criteria is identified by a unique test criteria version. Each test criteria version may contain a set of general info along with a list of test criteria parameters. For example, each version of test criteria may contain the following general information: test criteria version, carrier, and a reference to the source of the test criteria. As an example, the reference to the source of the test criteria may be AT&T Radiated RF Parametric Inspection Requirements Mobility Revision 08.08.

In one embodiment, the test sequence ID and test criteria are identified by a test suite entry in the database 120. Each test suite entry may identify the test sequence ID and test criteria version to execute for the test. In one embodiment, each model may be assigned a unique test suite ID. In one embodiment, the combination of test suite ID, test set model/version, carrier and functional group identify the test set entry to use. A functional group is a department or group within the department needing to differentiate test results from other groups and or having unique functional tailoring of the ARMS operations. This level of abstraction allows the test criteria version or test sequence ID to be changed easily for all associated models running the same test definition. This also allows the support of different test set versions running the same models. In one embodiment, the test suite entry may contain a human readable name used for selection from the dashboard. A history of all test suite entries may be maintained in the database 120.

The process 300 then updates the configuration time for the test port at step 314. The port configuration process then terminates and the test port is ready for RF testing. Updating the configuration time resets or initiates a time period before the port configuration expires. For instance, in one embodiment, the port configuration expires after a specific time period defined by the user type. For example, in one embodiment, if a DUT is attempted to be run after port configuration has expired, the application forces the port to be reconfigured. Additionally, if port configuration has expired prior to login, the configuration persistence parameters is not be loaded for that port and reconfiguration is required. Similarly, in one embodiment, if port configuration expires while the test port is idle, the test port configuration is cleared.

Figure 4:
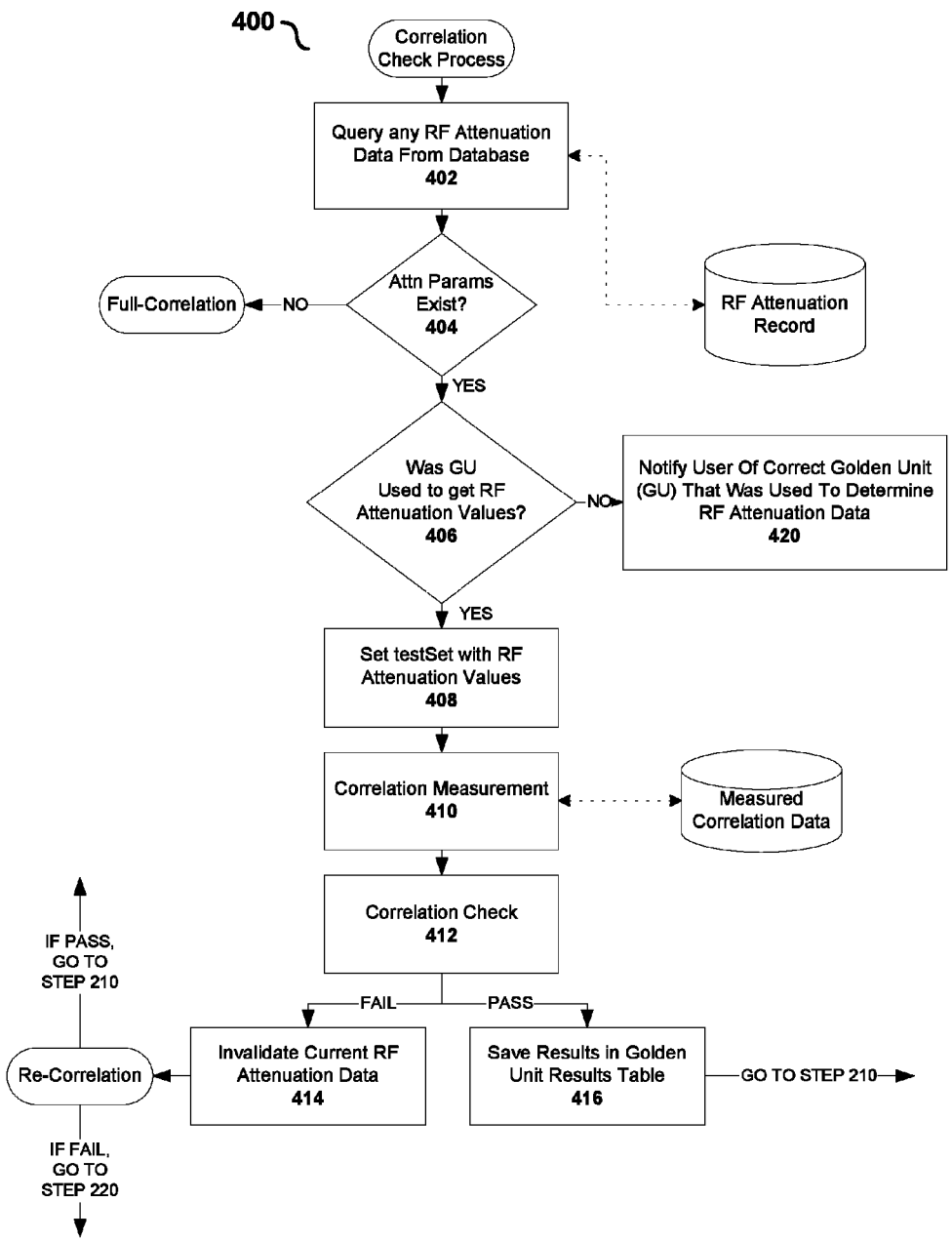
FIG. 4 is a flowchart depicting a process for performing a correlation check in accordance with a disclosed embodiment.

FIG. 4 is a flowchart depicting a correlation check process 400 for performing a correlation check in accordance with a disclosed embodiment. The correlation check process 400 begins at step 402 by querying the database 120 for any RF attenuation data as described above. For example, in one embodiment, the process attempts to read the attenuation values from the database 120 using the above search criteria for the RF attenuation values. The process determines based on the results of the query whether any RF attenuation parameters exist at step 404. If no record is found, the process is configured to perform a Full-Correlation as will be described in FIG. 5.

If a record is found, the process checks the golden unit connected to the test port to determine if it is one of the golden units used to generate the RF attenuation values (step 406). If the golden unit connected to the test port is not one of the golden units used to generate the RF attenuation values, the process notifies the user at step 420 to replace the current golden unit with one of the golden units listed in the RF attenuation record. If it is one of the golden units used to determine the attenuation values, the process loads the attenuation values into the test set at step 408.

The process measures the correlation parameters at step 410. At step 412, the process performs a correlation check by comparing the measured correlation parameters to correlation data stored in the RF attenuation record found previously for the same golden unit. In one embodiment, each RF correlation parameter is compared using a fixed set of tolerances defined for each parameter. In one embodiment, the same set of tolerances is used for all models, carriers and test stations. In alternative embodiments, different set of tolerances may be used for different models, carriers, and/or test stations.

If the correlation check passes (i.e., is within tolerances for all measurements), the process saves the results in the golden unit test results table in the database 120. The process then continues to load the test criteria and test sequence (steps 310 and 312). If the correlation check fails to be within tolerances, the process at step 414 invalidates the current RF attenuation record in the database 120 and performs a re-correlation as will be described in FIG. 6. If re-correlation is successful, the process proceeds to load the test criteria and test sequence (steps 310 and 312).

FIG. 5 is a flowchart depicting a process 500 for performing a full-correlation to determine the initial RF attenuation data in accordance with a disclosed embodiment. The process begins at step 502 by attempting to read the attenuation values from the database 120. The RF attenuation data identifies the three golden units used to determine the attenuation values along with the correlation data measured for each of the three golden units. In one embodiment, the process uses reduced search criteria in querying the database 120 for the attenuation values. For example, in one embodiment, a basic search criteria for the RF attenuation values uses the following parameters: station ID, test set serial number or equivalent, RF shield box ID, RF cable ID, test set port number, carrier, OEM, model, and record status=active. In certain embodiments, if no attenuation record is found, the search criteria may be further reduced by eliminating one or more of the above parameters. For example, the process may be configured to repeat the search process and exclude the search criteria of "station ID", "test set port number", and/or "status".

At step 504, the process determines whether any attenuation values exist. If attenuation values were found at step 504, the process proceeds directly to loading the test set with the attenuation values at step 510.

However, if no attenuation values were found, the process sets the test set to its default RF attenuation settings at step 506. At step 508, the process performs a find attenuation function using the golden unit in the RF shield box. The process loads the test set with the attenuation values determined by the find attenuation function at step 510. The process then proceeds to performing a re-correlation. If re-correlation is successful, the process proceeds to load the test criteria and test sequence (steps 310 and 312). If re-correlation fails, the process proceeds to step 320 and records the error in the error log table.

FIGS. 6A and 6B depict a flowchart of a process for performing a re-correlation in accordance with a disclosed embodiment. In one embodiment, this process is performed using three golden units of the same model and same original equipment manufacturer.

For the first golden unit, if not previously determined, the process will identify the IMEI of the golden unit at step 604.

At step 606, the process retrieves the device information from the golden unit table in database 120. In one embodiment, the table used to maintain the set of golden units contains the following information.
1) IMEI of golden unit
2) Carrier
3) Model Specific Information
4) Associated TAC Codes
5) OEM
6) Model
7) Test Suite ID identifying what test to execute
8) Status—indicating if the unit is currently a valid golden unit
9) Date and Time Registered as golden unit Based on the retrieved device information from the golden unit table, the process at step 608 determines whether the device in the RF shield box is contained in the golden unit table and if so, whether the status of the device is valid. If the device is not listed in the golden unit table (i.e., the device is not a recognized golden unit), the process at step 622 will notify the user to replace the device with a golden unit.

For the first golden unit in the re-correlation process, the process proceeds directly to step 614 and measures the correlation parameters of the golden unit. The process will then repeat the process for the second and third golden units by prompting the user to place the next golden unit into the RF shield box at step 602.

For the second and third golden units, steps 604 and 606 are repeated to determine whether the device in the RF shield box is contained in the golden unit table and if so, whether the status of the device is valid. If the device is not listed in the golden unit table, the process at step 622 will notify the user to replace the device with a golden unit. If the device is a golden unit, the process at step 610 verifies that the device is not a golden unit that has been previously used during this re-correlation process. In other words, the re-correlation process requires three different golden units. If the device is a different golden unit, the process will verify that the device is for the same model and original equipment manufacturer (OEM) as the first golden unit. If the device is not for the same model and original equipment manufacturer as the first golden unit, the process at step 626 will notify the user to replace the device with a golden unit for the same model and original equipment manufacturer as the first golden unit. If the device is for the same model and original equipment manufacturer as the first golden unit, the process at step 614 measures the correlation parameters of the golden unit.

Once the correlation parameters of all three golden units are obtained, the process initializes a correlation algorithm at step 618. In one embodiment, the correlation algorithm calculates the standard deviation of each correlation parameter and verifies that it is within the predetermined standard deviation. If any parameter's standard deviation is beyond the defined amount, the correlation fails. The process at step 640 notifies the user that the test port cannot be calibrated. In one embodiment, the process may be configured to generate a maintenance ticket at step 642.

In one embodiment, for each parameter the process computes the average value of the three golden units. If any of the parameter's average value falls outside of predetermined minimum and maximum values, the process at step 620 provides a notification that the attenuation parameters need to be adjusted. Once the attenuation parameters are adjusted, the process at steps 622 through 632 repeats the process of measuring the correlation parameters of the three golden units. In one embodiment, this process is repeated until the correlation algorithm passes or fails.

In one embodiment, if the correlation algorithm shows it needs adjustments after three previous attempts or if it is determined that the attenuation adjustment did not improve the measurement on any attempt, the correlation fails and the process proceeds to step 640. If the correlation algorithm passes, the process stores the results in the RF attenuation data table in database 120 at step 650. As previously described, if the re-correlation process is successful, the process proceeds to load the test criteria and test sequence (steps 310 and 312). The port configuration process then terminates and the test port is ready for RF testing.

Figure 7B:
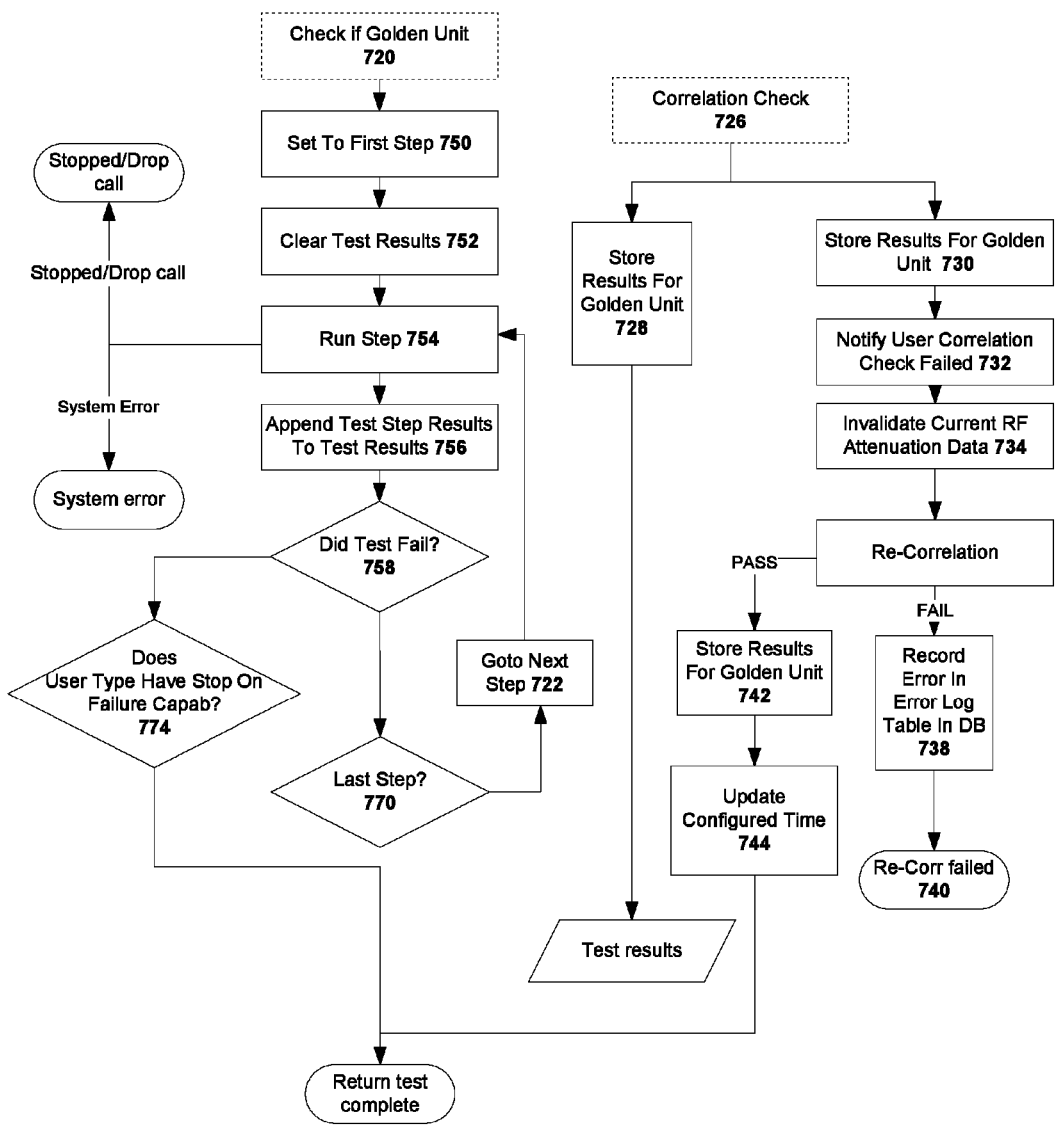

FIGS. 7A and 7B depict a flowchart of a process 700 for executing a RF test in accordance with a disclosed embodiment. In one embodiment, prior to executing an RF test, the process at step 702 determines whether the test port configuration has expired as previously described. For example, in one embodiment, the test port configuration may be configured to expire after a predetermined time such as, but not limited to, 24 hours. If the configuration time has lapsed, the process notifies the user and initiates the port configuration process.

If the test port configuration has not expired, the process reads the IMEI of the device at step 704. The process at step 706 determines whether the TAC code portion of the IMEI correspond to the list of TAC codes associated to the currently configured model. If the TAC code portion of the IMEI does not correspond to the list of TAC codes associated to the currently configured model, the process checks to see if the device is a golden unit at step 708. If the device is a golden unit, the process at step 710 proceeds to performing test port configuration for the new model as previously described.

If the device is not a golden unit, the process at step 712 determines the TAC code for the device and searches the list of TAC codes to determine if it is associated with a known model. If a match is found, the process at step 716 notifies the user that the device is a different model than currently configured.

If the TAC code for the device is not associated to any device in list of TAC codes, the process at step 714 notifies the user that the TAC code for the device is unknown and must be added to the list of TAC codes and associated with a model.

If, at step 706, the TAC code portion of the IMEI for the DUT does correspond to an entry in the list of TAC codes associated to the currently configured model and the process determines that the DUT is a golden unit at step 720, the process at step 722 determines whether the DUT is one of the devices used to generate the RF attenuation values for that test port. If it is not one of the devices used to generate the RF attenuation values for that test port, the process at step 724 notifies the user to replace the unit with one of the golden units listed in the RF attenuation record If at step 722, the process determines that the device is one of the golden units used to determine the attenuation values for that test port, the process initiates a correlation check by testing the golden using the attenuation values at step 724 and comparing the measurements with those stored in the current RF attenuation record for that golden unit on that test port at step 726. In one embodiment, each RF correlation parameter is compared using a fixed set of tolerances defined for each parameter. Additionally, in one embodiment, the same set of tolerances may be used for all models, carriers and test stations. If the correlation check is within tolerances for all measurements, the process at step 728 stores the results in the golden unit results table and notifies the operator of the passing results. The process is now ready for additional RF testing.

If the correlation check fails, a re-correlation is performed. In one embodiment, the process at step 730 stores the failed results in the golden unit results table in database 120 and notifies the user at step 732 that the correlation checked failed. The process invalidates the current RF attenuation data at step 734 and performs a re-correlation, as previously described, at step 736. If the re-correlation passes, the process stores the results for the golden unit at step 742 and updates the configuration time at step 744. The process is now ready for additional RF testing. Thus, one advantage of the disclosed embodiments is that a regular user/operator is able to perform re-configuration of the test port without support from a technician.

If re-correlation fails, the process records the error in the error log table in the database at step 738. At step 740, the process notifies the user that the re-correlation failed and the configuration for the port is cleared.

If, at step 706, the TAC code portion of the IMEI for the DUT does correspond to an entry in the list of TAC codes associated to the currently configured model and the process determines that the DUT is not a golden unit at step 720, the process at step 750 executes the test sequence identified during port configuration starting with the first step in the test sequence and repeats the testing at step 762 until the process, at step 760, determines that it is the last step in the test sequence. Before running the step at step 754, the process clears any prior test results at step 752. At step 756, the process appends or adds the results from running the step to any other test results.

Upon normal completion of the test, the process saves the test results in database 120. In one embodiment, the results contain all measurements taken during the test along with its pass/fail status and test criteria. In one embodiment, the test result details store the parametric information for all measurements taken. Each Measurement contains:
1) Test Parameter Measured
2) Actual Measured Value
3) Result—Pass/Fail/System Error
4) System Error code if System Error occurs
5) Time duration of this test step If the DUT is a golden unit, the results are stored in a different table in database 120 than standard DUTs (non-golden units). In one embodiment, if the test results are for a standard DUT and the user type does not have a write results capability assigned to it, the results shall not be saved in the database. This option enables technicians and engineers to run devices without the test results being recorded unless they are a golden unit.

At step 758, the process determines whether the test failed. The process evaluates the results of each test step against the test criteria loaded during port configuration. If a test step fails and the process determines at step 764 that the user type is assigned a capability to stop-on-fail, the process stops the test sequence and saves the results. In one embodiment, the process notifies the user of the failed results. In one embodiment, all failed results are displayed to the user with the ROIL failure code for the last failed test step.

In one embodiment, if during the run step, the test is aborted due to a failure in the device such as a dropped call, or the user aborts, or a system error occurs during the test sequence, the process saves the results including the reason for the test being aborted. The process then notifies the user of the failed results.

In one embodiment, the process may also be configured to monitor test results since the last port configuration to determine if a correlation check is needed for the test port. For example, in one embodiment, a correlation check is needed for the test port if 3 failed test results occur in a row or a certain number of failed tests occur within a particular period (e.g., 10 failed tests within an hour). In certain embodiments, the process may implement more sophisticated algorithms such as mean drift, number of measurements above or below mean in a row, and standard deviation change to determine if a correlation check is needed for the test port. When a station fault is detected, the collected fault detection data is stored in the database 120.

Thus, as described in detail above, the disclosed embodiments include an automated RF testing management system that is configured to control a plurality of RF test stations, each having multiple RF test sets with multiple test ports for performing RF testing of various electronic devices. As described, embodiments of the automated RF testing management system are configured to automatically identify an electronic device based on its IMEI and TAC code, retrieve the appropriate test sequence and test criteria for the identified electronic device, and execute RF testing on the electronic device. In addition, if necessary, or if user-initiated, the disclosed automated RF testing management system is able to perform a port configuration for configuring a test port to a particular make and model of an electronic device.

Other features of the various embodiments of the automated RF testing management system may include, but are not limited to, a diagnostics mode, a force re-correlation operation, an override login operation, a manage users mode, generating RQIL reports, generating statistical reports, add/delete golden units operation, edit test sequence or test criteria operations, add/delete or configure test stations or test ports, and edit correlation check tolerances. For each of these operations, the time the operation is performed and the user performing the operation may be recorded in the database.

For example, in one embodiment, a diagnostics mode may be available to user types which have been assigned the diagnostics capability. The diagnostics mode may only be required for RF test operation and not for port configure. The diagnostics mode may allow the user to:

run the test sequence until the user pauses the test or a breakpoint is reached
   pause the test sequence at the end of the current test step
   single step through the test sequence one test step at a time
   skip the next test step.
   repeat the last test step
   set/remove a breakpoint at the current test step
   clear all breakpoints.

In one embodiment, the diagnostic mode may display to the user the current test step and the spooled test results from the start of diagnostics mode. The user may be provided the ability to clear the spooled test results.

In one embodiment, the force re-correlation operation may be available to user types which have been assigned the force re-correlation capability. The operation may allow the user to invalidate correlation for the entire station, individual test set or a single test port. In one embodiment, if the user is logged in using an override login, as discussed below, the user may only be allowed to invalidate correlation for the test set associated with the override login and the two ports on the test set. When the user selects to invalidate correlation, the application will verify that no tests are being performed on any of the effected ports. If tests are running, the invalidate correlation operation is aborted and the user is notified. In one embodiment, if the entire station is selected to force re-correlation, all RF attenuation records for this station are set to a status of invalid and all effected ports are set to a non-configured idle state. In one embodiment, if a test set is selected to force re-correlation, all RF attenuation records for this station containing the test set serial number or equivalent is set to a status of invalid and all effected ports are set to a non-configured idle state. In one embodiment, if a test port is selected to force re-correlation, all RF attenuation records for this station containing the test set serial number or equivalent and the test port number is set to a status of invalid and all effected ports are set to a non-configured idle state.

In certain embodiments, the system is configured with an override login operation that allows an operator to log into one pair of test ports while another user is logged into the station. When the user attempts override login or logout the application will verify no tests are being performed on any of the effected ports. In one embodiment, if tests are running, the override shall fail and the user is notified. If the override login is successful, the capabilities assigned to the new user will be applied to the effected test ports. If the port was configured, the configuration will still remain active. Alternatively, in some embodiments, when the override user logs out, the effected ports will be un-configured and require port configuration to occur prior to testing any devices.

In one embodiment, the operator is capable of adding new users, inactivate users, change roles, reset passwords, change email addresses and view current users. When adding new users the operator is able to assign a role and optional email address for the user. The set of available roles is defined in the database as described above.

In one embodiment, when viewing results, the operator shall select what carrier and what functional group to view results from. In one embodiment, the view test results capability assigned to the user shall contain parameters that define which carriers or functional groups the user can choose to view test results from.

In some embodiments, the user is able to enter an IMEI and view a list of tests performed on the device. For each test performed the list shall contain serial number, OEM, model number, start time, stop time, station ID, port number and operator. The user is able to select individual tests and view the complete test details stored in the database. In one embodiment, the user is able to print test reports with and without parametric data.

In certain embodiments, the system is also configured to allow an operator to generate a supporting text file for generation of an RQIL Report. The operation will enter or scan in the IMEI of the device for the report. The operation shall display all test results for the device. In one embodiment, the user may select the two test runs for the report. Once selected the operation shall search the golden unit test result table for the most recent golden unit runs for that same model that were run on the same two ports as the selected runs and that used the same RF attenuation record as one of the two runs. The user will select one of the golden unit runs. Once selected, the operation shall generate an RQIL supported text file containing at least the following: full test results selected for the failing device, full test results for the golden unit selected above, and the RF attenuation values for both ports that the tests were ran. The user may store the file to a local or shared drive.

Additionally, in some embodiments, the statistical reports operation is capable of generating the following reports:

1) Throughput per OEM, model, test set and operator by Day, week, month, year
2) Pass, Fail, User Abort, and Dropped call, code failure yields per OEM, model, test set, and operator or combination thereof
3) Test times per model, scripts, test sets and operator or combination thereof
4) Distribution charts of test result measurements per model, test set, technology, band, channel and operator or combination thereof
5) Calculate UPH per operator.
6) Parametric failure rates per model and test set.
7) Station Utilization defined by Calculating RF Test Time+Correlation Time and dividing by number of Test Sets configured. Then dividing this by a User definable available Test Time.
8) The operation shall provide support to allow the user to export the reports to an Excel file.

Regarding golden units, in certain embodiments, the user may be able to register new golden units to the system. For example, in one embodiment, the user is first prompted to enter the IMEI of the new golden unit along with the carrier it is to be assigned. The operation uses the TAC code from the IMEI to determine if it is associated to any other golden units. If it is associated to other golden units, the new golden unit will be added to the database using the OEM, model and associated TAC codes from the associated golden unit. If the golden unit is a new model type, the user is prompted to enter the OEM, Model, Test Suite Entry and alternate TAC for the device. The new golden unit info will be added to the database for the selected carrier.

In addition, in some embodiments, the user is able to deactivate a golden unit from the list of golden units. In one embodiment, the record remains in the database, but its status set to 'Inactive'. The user is prompted to enter the IMEI for the device. The operation shall search the database for the device. If found, the record for the golden unit will be set to Status of 'Inactive'. The record is not be deleted from the database. If the IMEI provided by the user is not in the database, an error message will be displayed to the user.

In some embodiments, the user is capable to adding or removing TAC codes associated to a specific model. In one embodiment, changes are reflected in the associated TAC codes for all golden unit of the same model. The system will verify that any added TAC codes is not associated with any other model. In certain embodiments, notifications may be sent to certain people when a TAC code is added or removed. For example, in one embodiment, the capability assigned to a user shall identify if an email needs to be sent to the engineering operators when a TAC code is added. For instance, in one embodiment, if an email is to be sent, an email containing details of the TAC Code change is sent to all users assigned to the user type containing the "TAC Code Notification" capability.

In some embodiments, the user is capable of adding or editing a test suite entry. The user may select the test sequence ID and test criteria version used for automated RF testing. The user may also be able to add a new test criteria version to the database. For example, in one embodiment, the user may have the option to start with a blank set of test criteria or clone an existing version. In one embodiment, the user may have the ability to add and remove test parameters and edit min and max ranges. In one embodiment, once the new test criteria version is saved, editing of that version shall not be allowed. For this embodiment, changes would require the creation of the new version.

In some embodiments, the user may edit, invalidate or add new station configuration records in the database. In one embodiment, if the Station is assigned to a different carrier, all 'RF Attenuation Value' records in the database for this station are invalidated. In certain embodiments, the user may also edit the correlation check tolerances table.

Advantages of the disclosed embodiments include cost savings and increased productivity. For example, the disclosed embodiments eliminate the need for specialized technicians for performing test port configurations for each changeover to a new device model, reduces the operator's wait time, reduces the number of individual computer systems needed to control test sets (e.g., instead of 1:1, the disclosed embodiments provide 1:4 or higher ratio of computer systems to test sets). In addition, the disclosed embodiments increase throughput by reducing test time, performing multiple tests in parallel, and increases efficiency by providing a single interface for controlling multiple test sets.

The disclosed embodiments also provide a quality improvement in that there is better consistency of results from station to station and operation to operation. For example, instead of each station having to store a local copy of scripts and calibration files, the scripts and calibration files are stored in a central database. Scripts and calibration files can be automatically selected based on the make and model of the electronic device, which is determined automatically by reading the devices IMEI.

The disclosed embodiments also enable each station to receive updates automatically. Further, the disclosed embodiments provide a web based dashboard with metrics and ad-hoc reporting capabilities via the database. In addition, the disclosed embodiments provide real-time performance monitoring for early detection of issues with testing stations.

Other advantages of the disclosed embodiments may include the automated processing of a random batch of electronic devices. For example, in certain embodiments, the port configuration process may be completely automated such that the system selects the golden units for a particular model, controls the transfer of the golden units to the RF shield box of a test port (e.g., through a conveyor system, or using robotics), and performs the port configuration for any model of an electronic device. Thus, certain embodiments eliminate the need for an operator to manually insert a golden unit for port configuration and also eliminate the need to sort or identify electronic devices into batches of the same models.

Additionally, in certain embodiments, if needed, the RF shield box may include automated guides for positioning an electronic device to a desired testing position. For example, in one embodiment, based on identifying the model of the electronic device in the RF shield box, the disclosed automated radio frequency testing management system may retrieve data indicating the desired testing position of the electronic device and control the guides of the RF shield box to position the electronic device into the desired testing position.

The above disclosed embodiments has been presented for purposes of illustration and to enable one of ordinary skill in the art to practice the disclosed embodiments, but is not intended to be exhaustive or limited to the forms disclosed. Many insubstantial modifications and variations will be apparent to those of ordinary skill in the art without departing from the scope and spirit of the disclosure. For instance, although the flowcharts depict a serial process, some of the steps/blocks may be performed in parallel or out of sequence, or combined into a single step/block. The scope of the claims is intended to broadly cover the disclosed embodiments and any such modification.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

Additionally, although specific terms are employed herein, they are used in a generic and descriptive sense only and not for purposes of limitation. For instance, the term database, as used herein, is intended to include any form of organized data, including, but not limited to, data found in tables, charts, spreadsheets, and documents. Furthermore, the term database does not imply the use of a particular or specialized database software, the use of any particular data structure, nor does it imply the use of any particular hardware.

What is claimed is:

1. An automated radio frequency testing management system comprising:
   a database configured to store data for performing automated radio frequency testing on a plurality of electronic devices;
   a server in network communication with the database, the server configured to provide an interface for configuring the automated radio frequency testing management system and retrieving test results, wherein configuring the automated radio frequency testing management system includes setting configuration parameters within the database; and
   at least one test station in network communication with the database, the test station comprising a test station controller in communication with at least one radio frequency test set, wherein each radio frequency test set is configured with at least one test port configured with at least one radio frequency shield box, and wherein the test station controller is configured to receive data from the database to perform the automated radio frequency testing on the plurality of electronic devices; wherein the test station controller comprises:
      a non-transitory computer-readable storage media having stored thereon computer-executable instructions; and
      a processor for executing the computer-executable instructions, wherein the computer-executable instructions include instructions for:
         enabling the test station controller to communicate over the network with the at least one radio frequency test set and the database;
         controlling the at least one radio frequency test set to concurrently perform radio frequency testing of the plurality of electronic devices based on the data received from the database by determining whether an electronic device in the plurality corresponds to a currently configured model for the at least one test port; and
         querying the database to receive the data for performing the radio frequency testing of the electronic device in the plurality under test based on identifying a model of the electronic device in the plurality under test.

2. A test station controller comprising:
   a non-transitory computer-readable storage media having stored thereon computer-executable instructions; and
   a processor for executing the computer-executable instructions, wherein the computer-executable instructions include instructions for:
      enabling the test station controller to communicate over a network with a plurality of radio frequency test sets and a database;
      controlling the plurality of radio frequency test sets to concurrently perform radio frequency testing of electronic devices based on data received from the database by determining whether the electronic device corresponds to a currently configured model for a port on a radio frequency testing unit; and
      querying the database to receive the data for performing the radio frequency testing of electronic devices based on identifying a model of an electronic device under test.

3. The test station controller of claim 2, wherein each of the plurality of radio frequency test sets is configured with multiple test ports to support multiple radio frequency shield boxes.

4. The test station controller of claim 3, wherein the computer-executable instructions further include instructions for:
   performing an automated port configuration of at least one test port of the multiple test ports for a particular model of an electronic device.

5. The test station controller of claim 4, wherein the computer-executable instructions further include instructions for:
   performing an automated correlation check of the at least one test port; and
   responsive to the automated correlation check of the at least one test port indicating that the at least one test port requires re-correlation, performing the re-correlation of the at least one test port.

6. The test station controller of claim 3, wherein the computer-executable instructions further include instructions for configuring each of the multiple test ports independently from other test ports.

7. The test station controller of claim 6, wherein the computer-executable instructions further include instructions for supporting simultaneous testing of different models on each of the multiple test ports.

8. The test station controller of claim 6, wherein configuring each of the ports is performed using one of a plurality of golden units as a calibration standard, wherein each of the golden units is associated with a particular service provider carrier, manufacturer, and model.

9. The test station controller of claim 2, wherein the computer-executable instructions further include instructions for:
   performing, upon startup of the system, a scan to determine whether any of the plurality of radio frequency test sets is in an inactive state;
   responsive to a determination that a radio frequency test set is in the inactive state, initiating a notification to inform a user that the radio frequency test set is in the inactive state; and
   responsive to a determination that no radio frequency test set is in the inactive state, clearing configuration settings of the plurality of radio frequency test sets and setting the configuration settings of the plurality of radio frequency test sets to a known state.

10. The test station controller of claim 9, wherein the known state is a previous configuration setting of the plurality of radio frequency test sets at a time when an immediately preceding user logged out of the system.

11. The test station controller of claim 2, wherein performing radio frequency testing of electronic devices further comprises:
responsive to a determination that the electronic device corresponds to the currently configured model for the port on the radio frequency test set, determining whether the electronic device is a golden unit;
responsive to a determination that the electronic device corresponds to the currently configured model for the port on the radio frequency test set and the electronic device is not a golden unit:
executing a test sequence that was set during a port configuration; and
evaluating results of the test sequence based on test criteria loaded during the port configuration.

12. The test station controller of claim 2, wherein performing radio frequency testing of electronic devices further comprises:
responsive to a determination that the electronic device does not correspond to the currently configured model for the port on the radio frequency test set, determining whether the electronic device is a golden unit;
responsive to a determination that the electronic device is a golden unit, performing a port configuration using the golden unit;
responsive to a determination that the electronic device is not a golden unit, determining whether the electronic device has a corresponding identifier; and
responsive to a determination that the electronic device has a corresponding identifier, initiating an alert notification indicating that the electronic device is a different model than the currently configured model for the port on the radio frequency testing unit.

13. The test station controller of claim 12, wherein the corresponding identifier is one of an international mobile equipment identity (IMEI) and a Mobile Equipment Identifier (MEID).

14. The test station controller of claim 13, wherein a Type Allocation Code (TAC) code portion of the IMEI is used in determining whether the electronic device corresponds to the currently configured model for the port on the radio frequency testing unit.

15. A method for performing automated radio frequency testing, the method comprising:
storing, in a database, testing instructions and data for performing the automated radio frequency testing on a plurality of electronic devices;
retrieving, by a test station controller, the testing instructions and data for performing the automated radio frequency testing from the database; and
controlling, by the test station controller, a plurality of radio frequency test sets to concurrently perform the automated radio frequency testing on the plurality of electronic devices using the retrieved testing instructions and data; wherein the test station controller comprises:
a non-transitory computer-readable storage media having stored thereon computer-executable instructions; and
a processor for executing the computer-executable instructions, wherein the computer-executable instructions include instructions for:
enabling the test station controller to communicate over a network with the plurality of radio frequency test sets and the database;
controlling the plurality of radio frequency test sets to concurrently perform the radio frequency testing of electronic devices based on data received from the database by determining whether an electronic device in the plurality under test corresponds to a currently configured model for a port on a radio frequency testing unit; and
querying the database to receive the data for performing the radio frequency testing of the plurality of electronic devices based on identifying a model of an electronic device in the plurality under test.

16. The method of claim 15, further comprising:
verifying results of the automated radio frequency testing on the plurality of electronic devices using the retrieved testing instructions and data; and
storing the results of the automated radio frequency testing on the plurality of electronic devices in the database.

17. The method of claim 15, wherein the testing instructions and data define user roles and functionalities available to each user role, tests to be performed, and test result parameters.

18. The method of claim 15, further comprising performing a trend analysis using the results of the automated radio frequency testing on the plurality of electronic devices stored in the database to determine when a radio frequency test set needs to be recalibrated.

19. The method of claim 15, further comprising performing a trend analysis using the results of the automated radio frequency testing on the plurality of electronic devices stored in the database to determine an issue with a particular model of one of the plurality of electronic devices.

* * * * *